United States Patent
Jales Costa et al.

(10) Patent No.: US 11,270,689 B2
(45) Date of Patent: Mar. 8, 2022

(54) DETECTION OF ANOMALIES IN THE INTERIOR OF AN AUTONOMOUS VEHICLE

(71) Applicant: Ford Global Technologies, LLC, Dearborn, MI (US)

(72) Inventors: Bruno Sielly Jales Costa, Dearborn, MI (US); Hanieh Deilamsalehy, Dearborn, MI (US); Marcos Pau Gerardo Castro, Dearborn, MI (US); Smita Vinayak Bailur, Dearborn, MI (US); Jinesh J. Jain, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 16/639,884

(22) PCT Filed: Aug. 25, 2017

(86) PCT No.: PCT/US2017/048606
§ 371 (c)(1),
(2) Date: Feb. 18, 2020

(87) PCT Pub. No.: WO2019/040080
PCT Pub. Date: Feb. 28, 2019

(65) Prior Publication Data
US 2020/0365140 A1    Nov. 19, 2020

(51) Int. Cl.
*G10L 21/0208* (2013.01)
*G05D 1/00* (2006.01)
(Continued)

(52) U.S. Cl.
CPC ............ *G10L 15/08* (2013.01); *G05D 1/0212* (2013.01); *G05D 1/0231* (2013.01); *G06N 20/00* (2019.01);
(Continued)

(58) Field of Classification Search
CPC .......................... G05D 1/0061; G05D 1/0088
See application file for complete search history.

(56) References Cited

U.S. PATENT DOCUMENTS 9,401,140 B1 * 7/2016 Weber .................... G10L 15/00
9,489,966 B1   11/2016 Hassani et al.
(Continued)

OTHER PUBLICATIONS

International Search Report of the International Searching Authority for PCT/US2017/048606 dated Nov. 7, 2017.

*Primary Examiner* — Jialong He
(74) *Attorney, Agent, or Firm* — Brandon Hicks; Eversheds Sutherland (US) LLP (57) ABSTRACT

An autonomous vehicle includes a microphone sensing sounds in the interior of the vehicle. The output of the interior microphone is processed according to an unsupervised machine learning model such that anomalies are indicated by the model. In response to detection of an anomaly, a remote dispatcher is notified, who may then dismiss the anomaly or transmit an instruction to the vehicle to alter its trajectory. The output of an exterior microphone and infotainment system may be removed from the output of the interior microphone prior to processing. An anomaly may be found to occur in response to detecting speaking of a keyword in the output of the interior microphone.

15 Claims, 5 Drawing Sheets

(51) Int. Cl.
  *G10L 15/22* (2006.01)
  *G10L 15/08* (2006.01)
  *G06N 20/00* (2019.01)
  *G05D 1/02* (2020.01)

(52) U.S. Cl.
  CPC ...... *G10L 15/22* (2013.01); *G05D 2201/0213* (2013.01); *G10L 2015/088* (2013.01)

(56) References Cited

U.S. PATENT DOCUMENTS

| | | | |
|---|---|---|---|
| 9,646,428 B1 | 5/2017 | Konrardy et al. | |
| 2010/0033313 A1* | 2/2010 | Keady | G08G 1/0965 340/438 |
| 2013/0267194 A1 | 10/2013 | Breed | |
| 2014/0240111 A1 | 8/2014 | Kleve et al. | |
| 2015/0248131 A1 | 9/2015 | Fairfield et al. | |
| 2016/0071399 A1 | 3/2016 | Altman et al. | |
| 2016/0303969 A1 | 10/2016 | Akula | |
| 2016/0370801 A1* | 12/2016 | Fairfield | G05D 1/0038 |
| 2017/0045885 A1* | 2/2017 | Okumura | B60W 30/00 |
| 2017/0136969 A1 | 5/2017 | Drescher et al. | |
| 2017/0192423 A1* | 7/2017 | Rust | G01C 21/3492 |
| 2017/0336788 A1* | 11/2017 | Iagnemma | G05D 1/0246 |
| 2018/0039265 A1* | 2/2018 | Lawler | B60W 50/14 |

\* cited by examiner

DETECTION OF ANOMALIES IN THE INTERIOR OF AN AUTONOMOUS VEHICLE

BACKGROUND

Field of the Invention

This invention relates to a sensor system and method for an autonomous vehicle.

Background of the Invention

Recent announcements from different auto companies (including Ford) predict fully autonomous cars (SAE level 4) to be commercially available in the next few years. The absence of a driver raises several problems that were not expected in a non-autonomous vehicle or an autonomous vehicle with a safety driver. Particularly for the ride-sharing and ride-hailing activities (where the passenger does not own the vehicle).

The system and methods disclosed herein provides an improved approach for promoting safety for autonomous vehicles in the absence of a safety driver.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1A:
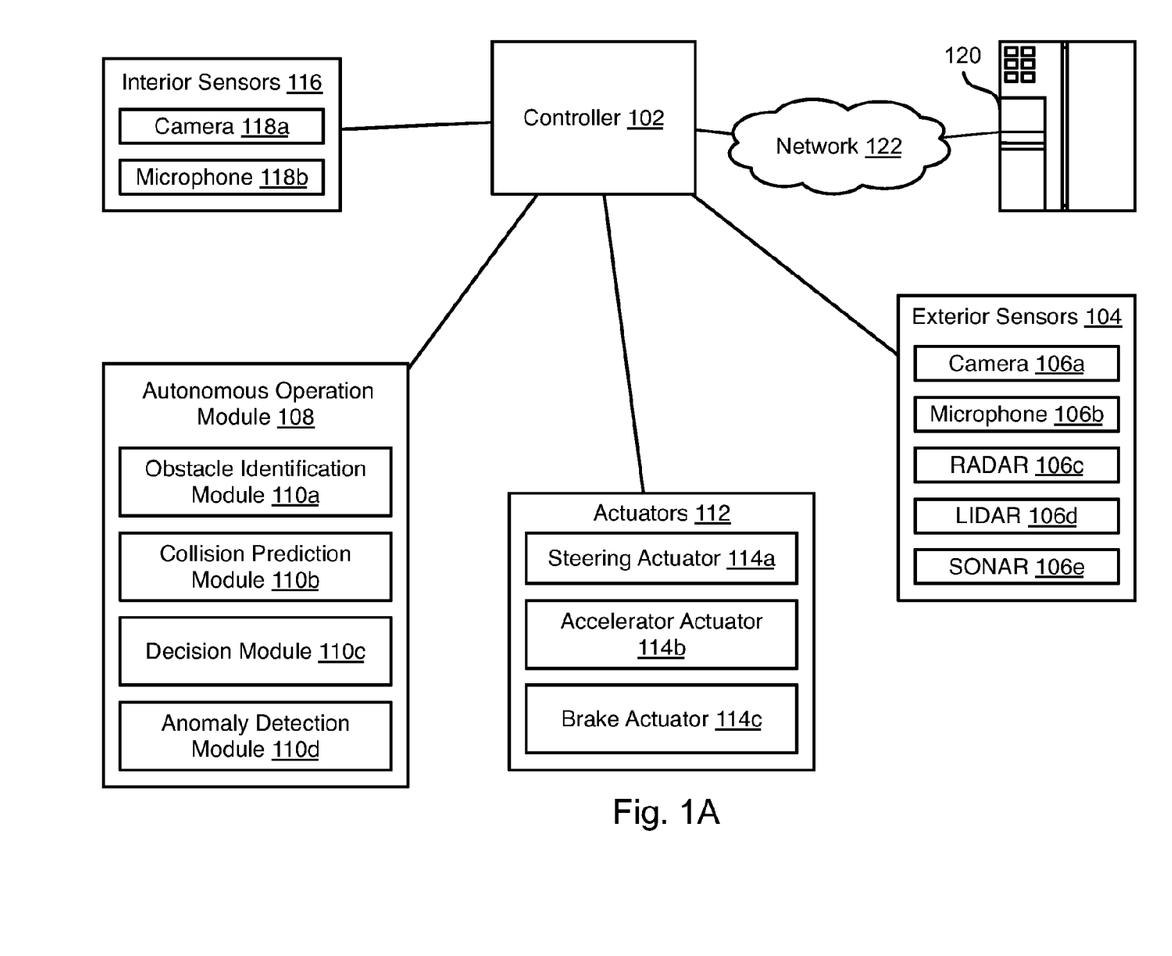
FIG. 1A is a schematic block diagram of a system for implementing embodiments of the invention.
Figure 1B:
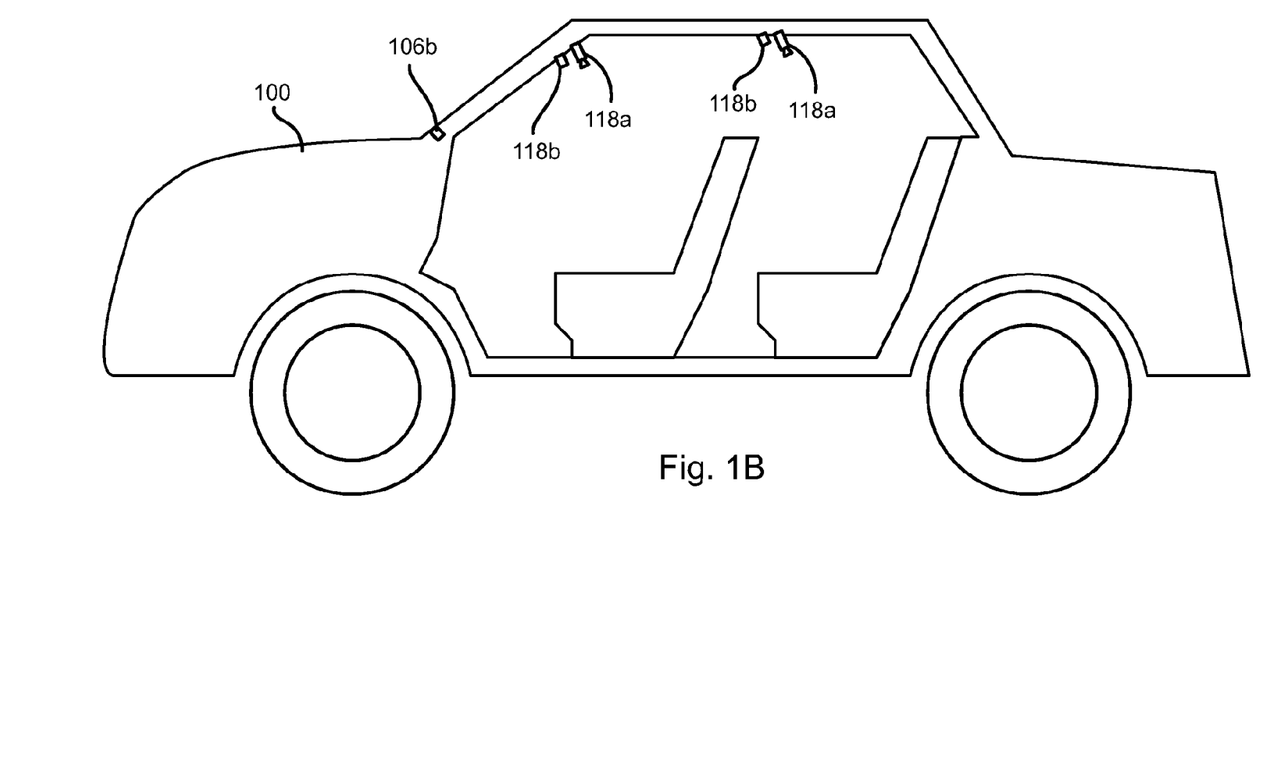
FIG. 1B is a schematic block diagram of a vehicle including interior sensors for implementing embodiments of the invention.

Referring to FIGS. 1A and 1B, a vehicle 100 (see FIG. 1B) may house a controller 102. The vehicle 100 may include any vehicle known in the art. The vehicle 100 may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. The controller 102 may receive one or more outputs from one or more exterior sensors 104. For example, one or more cameras 106a may be mounted to the vehicle 100 and output image streams received to the controller 102. The controller 102 may receive one or more audio streams from one or more microphones 106b mounted external to the vehicle or otherwise receiving sound from the exterior of the vehicle. For example, external microphones may have an open air channel between a sound sensor and the exterior of the vehicle and are preferably not mounted within the cabin of the vehicle 100. The one or more microphones 106b or microphone arrays 106b may be mounted to the vehicle 100 and output audio streams to the controller 102. The microphones 106b may include directional microphones having a sensitivity that varies with angle. In such embodiments, the direction that the microphones sense may be directed outward from the vehicle 100.

The exterior sensors 104 may include sensors such as RADAR (Radio Detection and Ranging) 106c, LIDAR (Light Detection and Ranging) 106d, SONAR (Sound Navigation and Ranging) 106e, and the like.

The controller 102 may execute an autonomous operation module 108 that receives the outputs of the exterior sensors 104. The autonomous operation module 108 may include an obstacle identification module 110a, a collision prediction module 110b, and a decision module 110c. The obstacle identification module 110a analyzes the outputs of the exterior sensors and identifies potential obstacles, including people, animals, vehicles, buildings, curbs, and other objects and structures. In particular, the obstacle identification module 110a may identify vehicle images in the sensor outputs.

The collision prediction module 110b predicts which obstacle images are likely to collide with the vehicle 100 based on its current trajectory or current intended path. The collision prediction module 110b may evaluate the likelihood of collision with objects identified by the obstacle identification module 110a. The decision module 110c may make a decision to stop, accelerate, turn, etc. in order to avoid obstacles. The manner in which the collision prediction module 110b predicts potential collisions and the manner in which the decision module 110c takes action to avoid potential collisions may be according to any method or system known in the art of autonomous vehicles.

The decision module 110c may control the trajectory of the vehicle by actuating one or more actuators 112 controlling the direction and speed of the vehicle 100. For example, the actuators 112 may include a steering actuator 114a, an accelerator actuator 114b, and a brake actuator 114c. The configuration of the actuators 114a-114c may be according to any implementation of such actuators known in the art of autonomous vehicles.

In embodiments disclosed herein, the autonomous operation module 108 may perform autonomous navigation to a specified location, autonomous parking, and other automated driving activities known in the art.

The autonomous operation module 108 may further include an anomaly detection module 110d. The anomaly detection module 110d detects anomalies occurring in the interior of the vehicle and takes one or more actions based thereon. The operation of the anomaly detection module 110d may be understood with respect to FIGS. 3 and 4 described below.

The anomaly detection module 110d may take as inputs the outputs of one or more interior sensors 116, such as one or more cameras 118a and one or more interior microphones 118b.

As shown in FIG. 1B, one or more cameras 118a may be positioned and oriented in the vehicle to have all seating positions in the field of view of at least one of the cameras 118a. Other areas of the interior of the vehicle may also be in the field of at least one of the cameras 118*a*. Microphones 118*b* may also be distributed throughout the interior in order to detect sounds from occupants of the vehicle. An external microphone 106*b* may be used as a reference to distinguish between external and internal sounds as discussed below.

The controller 102 may be in data communication with a server 120, such as by means of a network 122 that may include any wired or wireless network connection, including a cellular data network connection. The methods disclosed herein may be implemented by the server 120, the controller 102, or a combination of the two.

Figure 2:
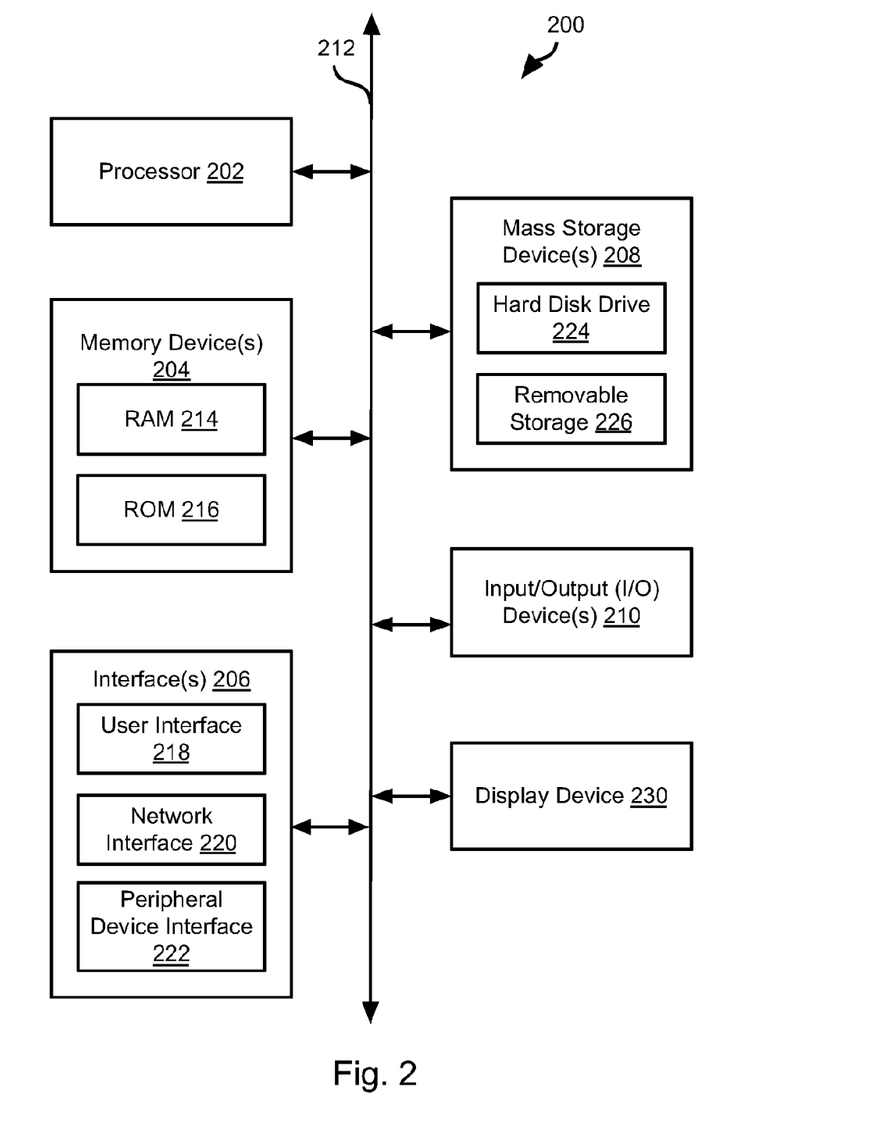
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 and server system 120 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
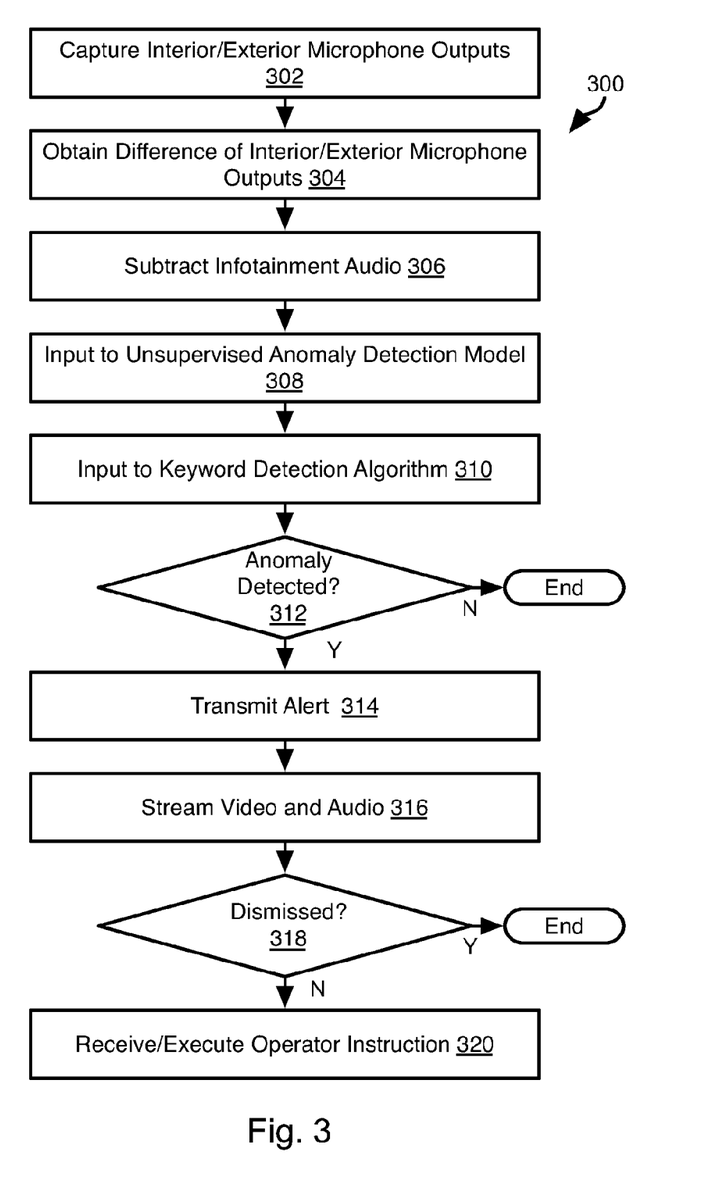
FIG. 3 is a process flow diagram of a method for detecting anomalies in the interior of an autonomous vehicle in accordance with an embodiment of the present invention.

Referring to FIG. 3, the illustrated method 300 may be executed by the controller 102 or by the controller 102 in cooperation with the server system 120. For example, sensor outputs may be processed locally according to the method 300 or transmitted to the server system 120 for processing.

The method 300 may include capturing 302 outputs of the one or more interior microphones 118*b* and the one or more exterior microphones 106*b*. The output of the one or more exterior microphones 106*b* may be subtracted 304 from the output of the one or more interior microphones 118*b*. The outputs of one or both of the microphones 106*b*, 118*b* may be scaled prior to subtracting in order to account for differences in sensitivities and for dampening of sound passing from outside of the vehicle to the interior.

Where there are multiple exterior microphones, the output of each microphones 106*b* may be subtracted from the output of the microphone 118*b* closest to that microphone 106*b*. Alternatively, an average of the outputs of the microphones 106*b* may be subtracted from the outputs of all of the microphones 118*b*.

The result of step 304 is a first difference signal in which the contribution of sounds exterior to the vehicle is reduced relative to the original output of the one or more interior microphones 118*b*. An infotainment audio signal may then be subtracted 306 from the first difference signal to obtain a second difference signal. The infotainment audio signal may be, or be derived from, signals coupled to speakers within the interior of the vehicle. This reduces the impact of sound emitted by interior speakers of the vehicle. The magnitude of the infotainment audio signal may be scaled according to a predetermined value prior to subtracting in order to more closely cancel out the infotainment audio signal from the second difference signal.

The second difference signal may be input 308 to an unsupervised anomaly detection model. In particular, the second difference signal may be input into an unsupervised machine learning algorithm that trains a model according to the signal over time. The unsupervised machine learning algorithm may be any unsupervised machine learning algorithm known in the art. The result of step 308 is a model that outputs whether a given signal is anomalous or not. In particular, the unsupervised anomaly detection model may detect audible anomalies indicating distress (e.g., shouting, screaming, impacts, etc.).

The method 300 may further include inputting 310 the second difference signal to a keyword detection algorithm. In some applications, a passenger in the vehicle may specify that a particular keyword shall be considered to indicate an anomaly. The keyword may be any arbitrary word or phrase selected by the user to function as keyword, e.g., "apple," "How are the flowers growing," or the like. This word may be input as speech or as text to the controller 102, such as prior to commencement of a ride in the vehicle. Accordingly, step 310 may include identifying words in the second difference signal using any speech recognition approach known in the art.

The method 300 may include evaluating 312 whether an anomaly is detected in the second difference signal. An anomaly may be determined 312 to be detected if either of (a) the unsupervised machine learning model indicates an anomaly in the second difference signal and (b) the predefined keyword is detected in the second difference signal. If an anomaly is not found, the method 300 may end, i.e. subsequent outputs of the microphone 118b may be evaluated according to the method 300.

If an anomaly is determined 312 to be detected, then various actions may be taken. For example, an alert may be transmitted 314 to a human operator. Such as a human operator in data communication with the server system 120. The alert may be in the form of an email, text, or application-specific alert output on a computing device used by the human dispatcher, such as a computing device having some or all of the attributes of the computing device 200.

The method 300 may further include streaming 316 outputs of one or both of the camera 118a and the one or more microphones 118b to the human operator, e.g. the same computing device to which the alert was transmitted 312 or a different computing device. Streaming 316 may include streaming the portion of the outputs of the one or more microphones 118b that were evaluated at step 302-312 and which was found to indicate an anomaly at step 312. The output of the one or more microphones 118b streamed at step 316 may include the second difference signal derived from the output of the one or more microphones 118b.

If an input is found 318 to be received from the human operator that indicates that the anomaly is dismissed, then the method 300 may end. The method 300 may then be repeated for subsequent outputs of the one or more microphone 118b. The input may be received from the same computing device to which the alert was transmitted or a different computing device.

If not, the method 300 may include receiving and executing 320 an instruction from the human operator, such as from the same computing device to which the alert was transmitted 314 or a different computing device. Examples of instructions may include an instruction to stop, turn, slow down, proceed to an alternative destination, proceed to a hospital or other provider of emergency services, or any other change to the operation and trajectory of the vehicle. The controller 102 then executes the instruction by stopping, turning, slowing, or otherwise proceeding autonomously to the destination specified in the instruction.

Figure 4:
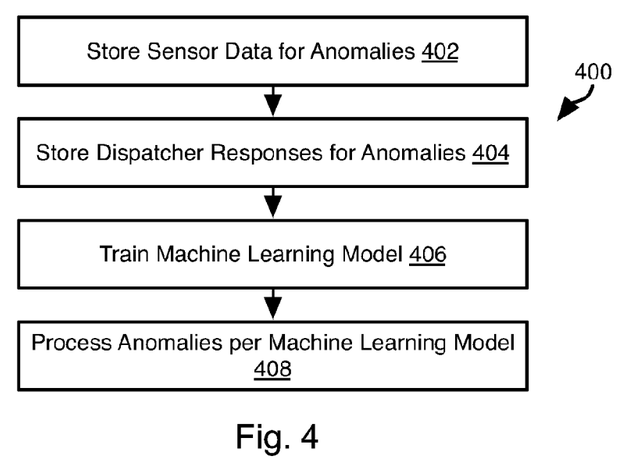
FIG. 4 is a process flow diagram of a method for training a machine learning model to handle anomalies in the interior of a vehicle in accordance with an embodiment of the present invention.

Referring to FIG. 4, given sufficient data regarding detected anomalies and operator instructions provided in response to them (either dismissal or modifications of the vehicle operation or destination), a machine learning model may be trained to autonomously invoke actions based on detected anomalies.

For example, the illustrated method 400 may include storing 402 sensor data for a region of time in which an anomaly was detected, e.g., 30 seconds, 1 minute, or some other interval, before and after the anomaly was detected. Sensor data may include outputs of interior sensors 116 and exterior sensors 104. The method 400 may further include storing 404 human operator responses to each anomaly (dismissed, stop, turn, slow, reroute, destination of reroute, etc.).

The data stored at steps 402 and 404 may then be used to train 406 a machine learning model with the sensor data for an anomaly being the input and the dispatcher response to the anomaly being the desired output for that sensor data. For example, many thousands, or tens of thousands, of anomalies and their corresponding operator responses may be processed in order to train the machine learning model to replicate the response of the human operator. The machine learning model may be any machine learning model known in the art such as a deep neural network, decision tree, clustering, Bayesian network, genetic, or other type of machine learning model.

The method 400 may then include processing 408 subsequent anomalies according to the machine learning model. For example, in the method 300, if an anomaly is detected, the sensor data (interior sensors 116 and exterior sensors 104) may be input to the machine learning model. The controller 102 may invoke whatever action is indicated by the machine learning model.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices.

When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system for a vehicle comprising:
   an interior microphone sensing an interior of the vehicle;
   an exterior microphone; and
   a controller coupled to the interior microphone and programmed to—
      autonomously cause the vehicle to traverse a trajectory;
      receive an output of the interior microphone during autonomous traversing of the trajectory;
      if an output of the interior microphone indicates an interior anomaly, alert a remote human dispatcher;
      subtract an output of the exterior microphone from the output of the interior microphone to obtain a first difference signal;
      subtract an output of an infotainment audio system from the first difference signal to obtain a second difference signal; and
      if the second difference signal indicates the interior anomaly, alert the remote human dispatcher.

2. The system of claim 1, wherein the controller is further programmed to:
   train an unsupervised machine learning model according to the output of the interior microphone over time; and
   if the unsupervised machine learning model indicates that the output of the interior microphone indicates the anomaly, alert the remote human dispatcher.

3. The system of claim 1, wherein the controller is further programmed to:
   perform speech recognition with respect to the output of the interior microphone; and
   if a result of speech recognition with respect to the output of the interior microphone includes a predetermined keyword, alert the remote human dispatcher.

4. The system of claim 1, wherein the controller is further programmed to:
   if an instruction is received from the human dispatcher, alter the trajectory of the vehicle according to the instruction.

5. The system of claim 1, wherein the controller is further programmed to, if the output of the interior microphone indicates the interior anomaly, transmit the output of the interior microphone to the remote human dispatcher.

6. The system of claim 1, further comprising a camera, a field of view of the camera including the interior of the vehicle;

wherein the controller is further programmed to, if the output of the interior microphone indicates the interior anomaly, transmit the output of the interior microphone and an output of the camera to the remote human dispatcher.

7. The system of claim 1, further comprising:
a steering actuator;
a brake actuator; and
an accelerator actuator;
wherein the controller is further programmed to autonomously cause the vehicle to traverse the trajectory by activating the steering actuator, brake actuator, and accelerator actuator.

8. The system of claim 1, further comprising:
a Radio Detection and Ranging (RADAR) sensor; and
a Light Detection and Ranging (LIDAR) sensor;
wherein the controller is further programmed to autonomously cause the vehicle to traverse the trajectory according to outputs of the RADAR sensor and LIDAR sensor.

9. A method comprising, by a controller of a vehicle:
receiving an output of an interior microphone sensing an interior of the vehicle;
autonomously causing the vehicle to traverse a trajectory;
determining that the output of the interior microphone indicates an interior anomaly;
in response to determining that the output of the interior microphone indicates an interior anomaly, transmitting an alert to a remote human dispatcher;
receiving, by the controller, an output from an exterior microphone;
subtracting, by the controller, the output of the exterior microphone from the output of the interior microphone to obtain a first difference signal;
subtracting, by the controller, an output of an infotainment audio system from the first difference signal to obtain a second difference signal;
processing the second difference signal according to an anomaly detection algorithm;
determining that an output of the anomaly detection algorithm indicates an interior anomaly; and
in response to determining that the output of the anomaly detection algorithm indicates the interior anomaly, transmitting, by the controller, the alert to the remote human dispatcher.

10. The method of claim 9, further comprising:
training, by the controller, an unsupervised machine learning model according to the output of the interior microphone over time;
determining, by the controller, that the unsupervised machine learning model indicates that the output of the interior microphone indicates the anomaly; and
in response to determining that the unsupervised machine learning model indicates that the output of the interior microphone indicates the anomaly, transmitting, by the controller, the alert to the remote human dispatcher.

11. The method of claim 9, further comprising:
performing, by the controller, speech recognition with respect to the output of the interior microphone;
determining, by the controller, that a result of speech recognition with respect to the output of the interior microphone includes a predetermined keyword; and
in response to determining that a result of speech recognition with respect to the output of the interior microphone includes the predetermined keyword, transmitting the alert to the human dispatcher.

12. The method of claim 9, further comprising:
receiving, by the controller, an instruction from the human dispatcher; and
in response to the instruction from the human dispatcher, changing, by the controller, the trajectory of the vehicle according to the instruction.

13. The method of claim 9, further comprising:
receiving, by the controller, an output of a camera, a field of view of the camera including the interior of the vehicle; and
in response to determining that the output of the interior microphone indicates an interior anomaly, transmitting the output of the interior microphone and the output of the camera to the remote human dispatcher.

14. The method of claim 9, further comprising autonomously causing, by the controller, the vehicle to traverse the trajectory by activating a steering actuator, a brake actuator, and an accelerator actuator.

15. The method of claim 9, further comprising autonomously causing, by the controller, the vehicle to traverse the trajectory according to outputs of a radio detection and ranging (RADAR) sensor and a light detection and ranging (LIDAR) sensor.

* * * * *